United States Patent
Glazko et al.

(10) Patent No.: US 7,349,461 B2
(45) Date of Patent: Mar. 25, 2008

(54) EFFICIENT BACK-END CHANNEL MATCHED FILTER (CMF)

(75) Inventors: Serguei A. Glazko, San Diego, CA (US); James Y. Hurt, San Diego, CA (US); Kuei-Chiang Lai, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 71 days.

(21) Appl. No.: 10/366,040

(22) Filed: Feb. 13, 2003

(65) Prior Publication Data

US 2004/0161022 A1    Aug. 19, 2004

(51) Int. Cl.
  H04B 1/00    (2006.01)
  H04L 1/00    (2006.01)
(52) U.S. Cl. ........................ 375/147; 375/343
(58) Field of Classification Search ................ 375/316,
  375/147, 346, 347, 348, 349, 130, 140, 150,
  375/152, 229–236, 343
  See application file for complete search history.

(56) References Cited

U.S. PATENT DOCUMENTS

| 6,064,338 | A  | * | 5/2000 | Kobayakawa et al. ...... 342/378 |
| 6,411,649 | B1 | * | 6/2002 | Arslan et al. ............... 375/232 |
| 6,459,728 | B1 | * | 10/2002 | Bar-David et al. .......... 375/231 |
| 6,496,494 | B1 | * | 12/2002 | Perrin et al. ................. 370/335 |
| 6,567,482 | B1 | * | 5/2003 | Popovic' ...................... 375/343 |
| 6,628,700 | B1 | * | 9/2003 | Miura ......................... 375/148 |
| 6,757,272 | B1 | * | 6/2004 | Abeta et al. ................. 370/342 |
| 6,771,690 | B2 | * | 8/2004 | Heikkila ..................... 375/147 |
| 2001/0036223 | A1 |  | 11/2001 | Webster et al. ............. 375/152 |
| 2002/0136234 | A1 |  | 9/2002 | Eriksson et al. ............ 370/345 |
| 2002/0176393 | A1 | * | 11/2002 | Maruyama .................. 370/342 |

FOREIGN PATENT DOCUMENTS

EP    1296474    3/2003

* cited by examiner

*Primary Examiner*—Cheih M. Fan
*Assistant Examiner*—Jason M. Perilla
(74) *Attorney, Agent, or Firm*—Howard H. Seo; Peng Zhu; Thomas R. Rouse

(57) ABSTRACT

An efficient method and apparatus for implementing a back-end channel matched filter in a receiver is disclosed. A typical channel matched filter embodiment includes a peak detector for establishing processing synchronization from a despread signal, a channel estimator producing a channel impulse response (CIR) estimate from the despread signal based on the synchronization by the peak detector and a back-end symbol combiner coherently combining dominant multipath components of the despread signal by weights based on the CIR estimate based on the synchronization by the peak detector to generate a decision variable. In a digital spread spectrum implementation, the despread signal operated on by the channel matched filter has been previously been correlated with a spreading sequence replica.

25 Claims, 8 Drawing Sheets

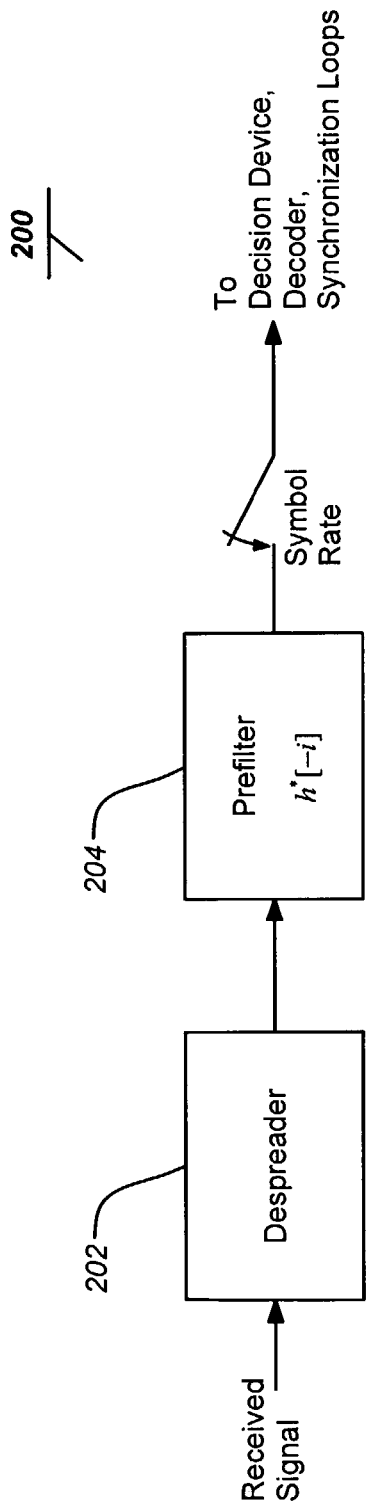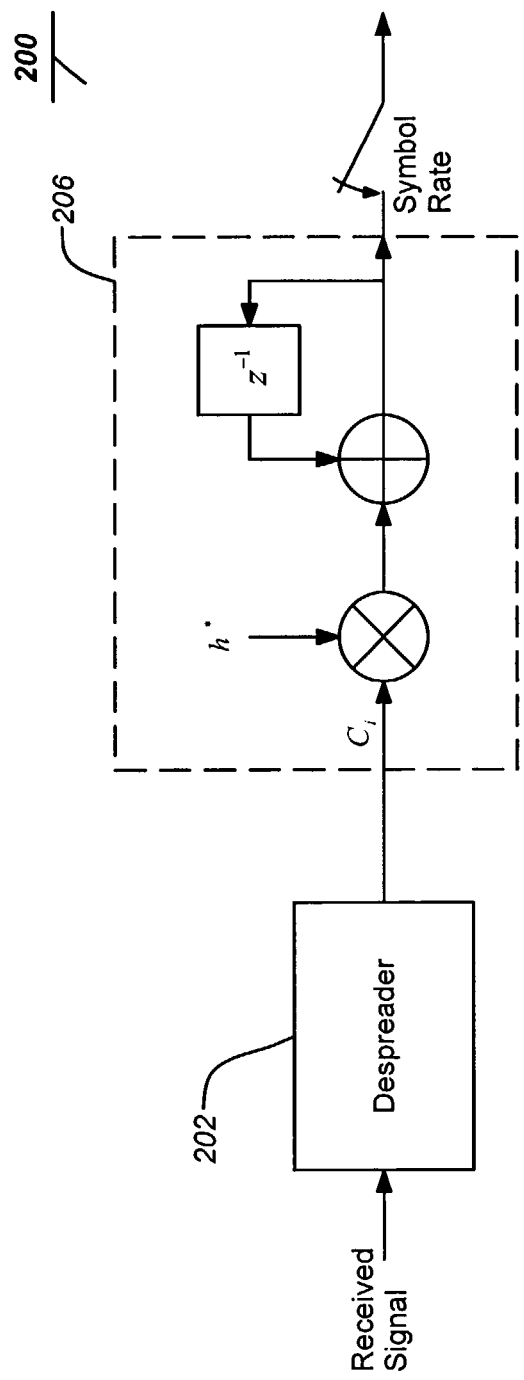

EFFICIENT BACK-END CHANNEL MATCHED FILTER (CMF)

BACKGROUND

1. Field

The present invention relates to systems and methods for implementing channel matched filter (CMF) circuits, and particularly for implementing channel matched filter circuits to facilitate spread spectrum reception in a wireless local area network (LAN). For example, the present invention finds application in the Institute of Electrical and Electronics Engineers (IEEE) 802.11 standard for wireless LANs using spread spectrum.

2. Description

In a typical wireless communications system, the transmitted signal travels through multiple propagation paths before arriving at the receiver. Along each path, components of the transmitted signal undergo random attenuation and phase offset, and may add destructively or constructively with each other at the receiver; this multipath effect can cause degradation of signal-to-noise ratio (SNR), resulting in severe performance impairment. Therefore, it is desirable to appropriately combine these multipath components such that the SNR is enhanced (relative to that of any individual multipath component). Implementing short packet wireless data communications over a wireless channel, such as that specified in IEEE 802.11, poses challenges in combating these multipath problems.

The channel matched filter (CMF) is commonly used to maximize the received SNR in a technique sometimes referred to as "maximal ratio combining". However, previous implementations of this technique assume correction of the channel effects at a chip level, i.e. before the despreader. This is generally done because of the need for time and phase tracking. Applying this approach, the signal component from each path is weighted by the complex-conjugate of the (complex-valued) channel gain of the corresponding path; the sum of these weighted components has the optimum SNR, and is passed to the remaining portion of the receiver (such as a decision device, or the decoder).

FIG. 1 is a block diagram of a conventional CMF for a communication system utilizing direct-sequence spread spectrum signaling. The conventional CMF 100 is implemented as a pre-filter 102 followed by a despreader 104, i.e. a "front-end" CMF, because the pre-filter precedes the despreader. The sampling period is denoted as $T_s$ and the complex valued channel gain of the ith multipath component as h[i], where h[i] is the discrete-time version of the continuous-time channel impulse response (CIR) h(t), i.e., $h[i] = h(t)|_{t=iT_s}$. The pre-filter has a response of $\hat{h}^*[-i]$, i.e. matched to the time-reversal and complex-conjugated version of the CIR, where * denotes the complex conjugation operation, and $\hat{h}[i]$ is an estimate of h[i].

In the conventional CMF 100, the received signal samples are first convolved with the pre-filter 102, $\hat{h}^*[-i]$, which performs "matched filtering" to generate the combined samples with enhanced SNR. The despreader 104 correlates these combined samples of the pre-filter 102 that correspond to a symbol interval (indicated by the symbol rate switch 106) to generate the decision variable. The decision variable output 108 can be used to produce an estimate of the transmitted symbol and/or to drive the synchronization loops. Implementation of the CMF 100 in this manner requires complex DSP or microprocessor computations.

There is a need for channel matched filters with improved speed and efficiency. There is particularly a need for channel matched filters which do not require complex processing and computation. Further, there is a need for such channel matched filters in WLAN applications. The present invention meets these needs.

SUMMARY

The present invention uses despread and combined samples (passed through a despreading matched filter) to efficiently implement a post despreading channel matched filter. In addition, the estimation and channel profile evaluation is performed by a logic mechanism to determine the largest peak called cursor and produce the conjugated form of channel matched filter to be used on the despread and combined samples. This implementation represents a compact hardware block that does not need complex DSP or microprocessor computations as with previous matched channel filters. This symbol level (or "back-end") channel matched filter structure enables the replacement of M multipliers (where M is the length of the channel matched filter) with a single shared multiplier. An efficient coefficient estimation mechanism provides for nearly optimal performance across a wide range of multipath channels for high-speed wireless data communication.

Embodiments of the present invention estimate the magnitude profile of the channel with the peak detector. The estimates are then presented to a logic function that determines the largest peak and, in some embodiments, the second largest peak. Further, the logic function determines the earliest arriving peak position, treating it as a start of the channel impulse response. The channel impulse response estimate is obtained via coherently averaging the despread samples over several periods of spreading code using a decision directed technique. Following this, the coefficients are conjugated and scaled to be applied in the back-end channel matched filter.

The back-end channel matched filter can be implemented by combining the matched filter elements after despreading using a static set of channel matched filter coefficients. Only one multiplier is needed to achieve the same performance as with a conventional front-end channel matched filter.

Embodiments of the present invention allow uncorrected input samples to pass to the despreading device and then are later corrected using a static set of channel matched filter coefficients. Estimation of the channel matched filter coefficients in conventional matched filters involve digital signal processor (DSP) or microprocessor computations. However, the present invention utilizes a hardware (HW) focused approach which is fast and efficient. Although the short spreading sequence present challenges in finding the earliest arriving path, i.e. the start of the channel response, two techniques are shown herein to efficiently unfold the channel response and find the cursor and earliest arriving path.

Embodiments of the present invention encompass a back-end CMF (or post-despreading CMF) which can be used in short packet wireless data communications employing direct-sequence spread spectrum signaling. The invention describes a novel, hardware-efficient implementation of a CMF that can be used in place of a conventional front-end CMF.

A typical embodiment of the invention comprises a channel matched filter including a peak detector for establishing processing synchronization from a despread signal and a channel estimator producing a channel impulse response (CIR) estimate from the despread signal based on the synchronization by the peak detector. Further, a back-end symbol combiner coherently combining dominant multipath components of the despread signal by weights based on the CIR estimate based on the synchronization by the peak detector to generate a decision variable is used. The despread signal comprises a signal correlated with a spreading sequence replica.

In further embodiments, the peak detector typically establishes processing synchronization by estimating a cursor timing and a symbol boundary from a magnitude profile of the despread signal for the channel estimator and symbol combiner. A variance of the magnitude profile can be reduced by averaging a magnitude value over a plurality of nearby values. In addition, the cursor timing can be estimated by determining an offset of a largest magnitude value of the magnitude profile. Further, the symbol boundary can be determined by a fixed offset prior to the cursor on the magnitude profile. Alternately, the symbol boundary can be determined by a furthest local maximum having a magnitude exceeding a threshold value prior to the cursor on the magnitude profile.

The channel estimator in typical embodiments produces the CIR estimate in a decision directed manner. The channel estimator can use a slicer that operates at approximately the cursor position to produce the channel impulse response (CIR) estimate. The slicer can be operated over a plurality of probing intervals for averaging to reduce variance of the CIR estimate. Further, the output of the channel estimator can be processed by one or more of the operations comprising complex conjugation, truncation and scaling to produce the CIR estimate to improve the overall result of the CMF.

In further embodiments, the symbol combiner combines the despread signal by the weights based on the CIR estimate to generate the decision variable. The symbol combiner can comprise a linear combiner combining the despread signal by the weights based on the CIR estimate by performing a series of multiply and add operations to generate the decision variable.

BRIEF DESCRIPTION OF THE DRAWINGS

Referring now to the drawings in which like reference numbers represent corresponding parts throughout:

FIGS. 2A and 2B are block diagrams of a typical back-end channel matched filter of the present invention;

DETAILED DESCRIPTION

In the following description of the preferred embodiment, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

1. Back-End Channel Matched Filter Overview

Figure 1:
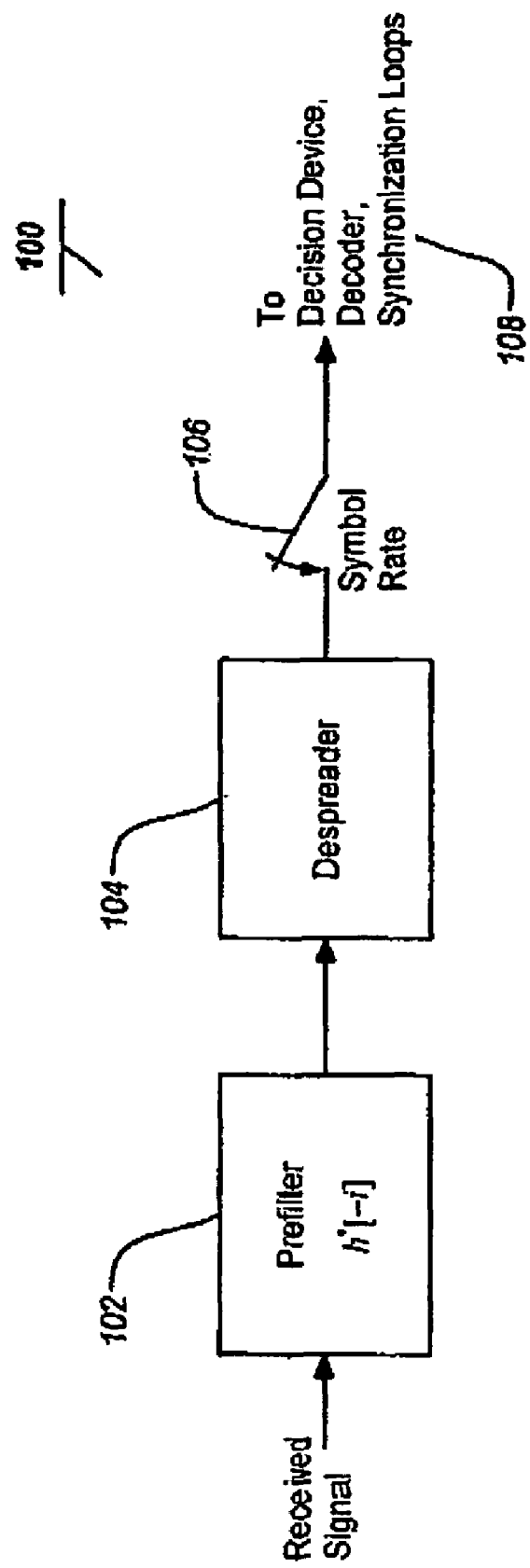
FIG. 1 is a block diagram of a conventional channel matched filter for a communication system utilizing direct-sequence spread spectrum signaling.

The conventional, front-end CMF of FIG. 1 represents a concatenation of two linear time-invariant operations, since the despreader can be consider as a finite-impulse response (FIR) filter with a response equal to the time-reversal version of the spreading sequence. Hence, the connection can be interchanged without altering the overall response of the concatenated system.

FIGS. 2A and 2B are block diagrams of a typical back-end channel matched filter implementation of the present invention. The back-end CMF architecture 200 with the filter 204 situated after the despreader 202 as shown in FIG. 2A, yields the same mathematical result as the conventional front-end CMF of FIG. 1. In addition, because convolving the received signal with h $\hat{h}*[-i]$ is equivalent to a (running) correlation of the received signal with $\hat{h}*[i]$, the back-end CMF can implement correlation with $\hat{h}*[i]$ using a series of multiply-and-add operations (referred to as the back-end combiner 206), as shown in FIG. 2B. Note that $\hat{h}_i* \equiv \hat{h}*[i]$ applying a simplified notation, and $c_i$ is the despreader output for the corresponding ith multipath component. (Estimation of h[i] is detailed in subsequent sections.)

It is clear that the back-end CMF of the present invention is more hardware efficient because only one complex multiplier is required. "M" complex multipliers, the length of {h[i]}, are required for conventional front-end CMFs. It is also important to note that the matched filtering in the front-end structure is performed at the received sample level (before the despreader) in a convolution fashion, while it is performed at the symbol level in the back-end configuration (after the despreader) in a correlator fashion.

Figure 2C:
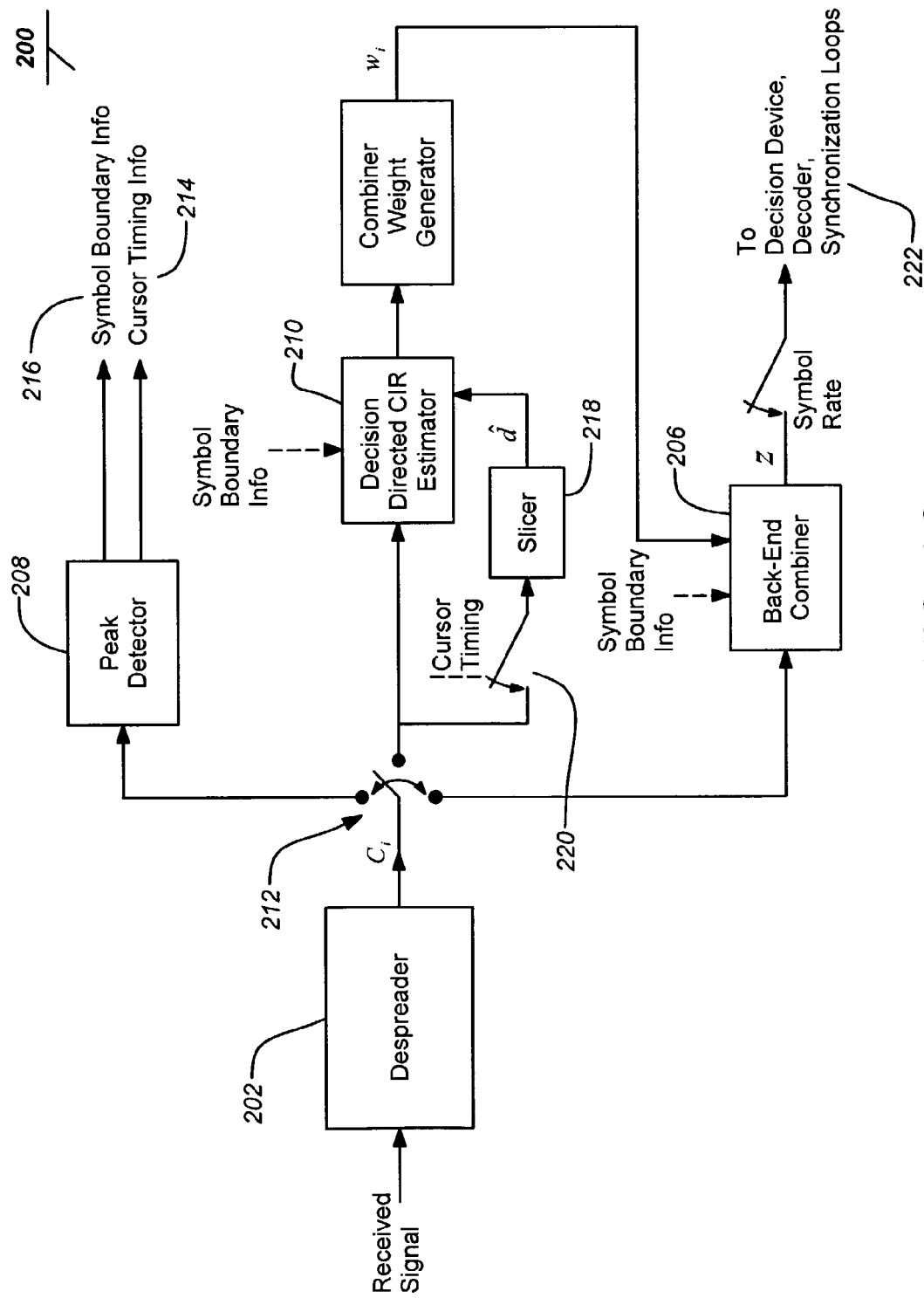
FIG. 2C is a block diagram of a typical back-end channel matched filter of the present invention.

FIG. 2C is a block diagram of a typical back-end CMF of the present invention. The filter 204 of a typical back-end CMF architecture 200 comprises three major component blocks after the despreader 202. The peak detector 208 that estimates the timings of the strongest path and the first arriving path. The first arriving path is defined as the earliest arriving replica of a single transmitted pulse that has sufficiently strong power, and the position of which is referred to as the symbol boundary (i.e., it is treated as the start of a symbol). The channel estimator 210 estimates the channel impulse response (CIR) by coherently averages the (complex-valued) channel gain profile using the pseudo-noise probing method. The back-end symbol combiner 206 coherently combines signal energy from dominant multipath components by appropriate weights obtained from the CIR estimate to maximize the SNR of the decision variable. The despread signal $c_i$ can be alternately applied to each of these components through switch 212. The operation of each of these components will be described in more detail as follows.

1.1 Peak Detector

The peak detector 208 is used during the acquisition period, when the switch 212 in FIG. 2C is in the top position, to perform the following two functions. The peak detector 208 establishes a coarse timing, based on the estimated position of the strongest multipath component, i.e., the cursor timing 214. In addition, the peak detector 208 provides the symbol boundary 216.

The despreader 202 preceding the peak detector 208 performs correlation of the received samples with a local replica of the spreading sequence. In the following discussion, the number of samples per chip interval is Q and the number of chips in the maximum tolerable delay is N. For a system utilizing periodic spreading sequences, i.e., spreading sequences whose period is the same as the symbol interval, the value of N cannot exceed the processing gain, P, because a multipath component with a delay of P+j chips cannot be distinguished from one with a delay of j chips. Note that this N chip interval starting from the symbol boundary contains the arriving times of dominant multipath components corresponding to a given transmitted symbol, and will be referred to as a probing interval since it will be used in the pseudo-noise probing method to analyze the channel (as described in the channel estimator section hereafter).

The cursor and symbol boundary lie somewhere within any segment of QN samples in a packet. To locate the symbol boundary, the timing of the strongest multipath component is first found. A segment of QN samples that starts immediately after the packet starts can be typically identified by some sort of energy detection mechanism, e.g. the average received energy exceeds a prespecified programmable threshold, such as with a simple $i^2+q^2$ accumulator with a threshold or analog power detector. The despreader 202 generates QN correlations, denoted as $c_i$, i=1, . . . , QN, with each offset corresponding to a multipath component that is spaced $(i-1)T_s$ away from the start of that segment. Since the spreading sequence typically exhibits very small sidelobes in the correlation properties, the magnitude of these correlations can be used to represent the magnitude of the corresponding multipath component. To reduce the variance of such an estimate, the magnitude of the correlation at each offset is averaged over several such segments. These averaged magnitudes comprise an estimate of the magnitude profile of the channel. The largest of these averaged magnitudes can be considered the strongest multipath component. The corresponding offset is the cursor position.

Once the strongest multipath component is located, the first arriving path that has sufficiently strong power can be determined or estimated. The position of this multipath component is referred to as the symbol boundary. This is important for the CMF in order to collect signal energies in samples that correspond to the same symbol period. The first arriving path that has sufficiently strong power can be estimated using one of two alternate approaches.

Under the first approach, the symbol boundary is set to a fixed offset prior to the cursor. This fixed (but programmable) offset can be determined based on a statistical analysis of the typical root-mean-square (rms) delay spreads of an intended environment. For example, an indoor environment of a typical office building possesses a certain profile with short multipath, whereas a large indoor space may have a mix of short and long multipath. A flat outdoor landscape could exhibit long (or even no) multipath. WLAN, typically applied with the present invention, is primarily intended for indoor usage.

The second approach is more complex; the magnitude profile can be analyzed by additional hardware logic or a digital signal processor (DSP) to determine the first arriving path. For example, the farthest local maximum that locates on the left of the cursor within a range limited by a pre-specified programmable maximum offset and whose power exceeds a preset programmable threshold can be considered as the symbol boundary.

1.2 Channel Estimator

The purpose of the channel estimator 210 is to produce an estimate of the channel impulse response (CIR). Channel estimation can be initiated shortly after the symbol boundary has been established and timing and frequency/phase synchronization have been achieved, i.e., the switch 212 is in the middle position. The frequency and phase errors have to be removed prior to channel estimation.

The despreader output $c_i$ that corresponds to a probing interval can be used for CIR estimation. Because of the spreading sequence exhibits small sidelobes, the pseudo-noise (PN) probing method uses the fact that $c_i \approx h_i \cdot d$, where d is the transmitted symbol in the beginning of that probing interval and i=1 corresponds to the first arriving path, i.e., the symbol boundary, estimated from the peak detector 208. In systems where an unmodulated pilot signal is not available, such as that specified in the IEEE 802.11b standard, the CIR estimate is obtained in a decision-directed manner. That is, assuming the decisions are sufficiently accurate, $$\hat{h}_i \approx c_i \cdot \hat{d}^* \qquad (1)$$

where $\hat{d}$=slicer($c_{cursor}$) is an estimate of d that is obtained from the correlation at the cursor position. Referring to FIG. 3C, the slicer 218 is triggered by the cursor timing 214 from the peak detector 208 through switch 220. The correlation at the cursor position (i.e., the strongest multipath component) is used to obtain the best channel estimate before the combining can occur (which needs to wait until the CIR estimate is available). Note that the slicer operation is essentially a decision device that depends on the constellation of the modulation symbols used in the system. Similar to the averaging applied in the peak detector, equation (1) is performed over several probing intervals for averaging to reduce the variance in the estimate. Thus, the peak detector uses non-coherent averaging, while the the channel estimator uses nearly the same hardware to perform coherent averaging with the slicer decision variable. In addition, since the channel condition typically does not change dramatically over a packet duration, the CIR estimate can be applied to the remainder of the same packet. The resulting averaged CIR estimate can be denoted as $$\{\hat{h}_i\}_{i=1}^{QN}.$$

The CIR estimate is then further processed to generate the combiner weight that will be used in the back-end combiner (described in the following section).

In order to determine the combiner weights, the CIR estimate typically undergoes operations including complex conjugation, truncation and/or scaling. Complex conjugation can be performed as previously discussed with respect to FIG. 2B. Truncation can be performed because the tail end of the multipath profile typically has much lower power, e.g. as with indoor channels. As combining these multipath components yields diminishing returns, these multipath components need not be incorporated in the combiner. An exemplary truncation limit is to use the first K<QN components for combining (where K is a progammable value). Scaling of the combiner output can be applied because the combiner output is typically used to drive the synchronization loops (as it has a higher SNR). The loop bandwidth of the synchronization loop depends on the power of the combiner output, which in turn depends on the scaling of the combiner weights. Simple scaling, implemented by a hardware shift operation, can accomplish this goal.

1.3 Back-End Symbol Combiner

The combiner weight from the combiner weight generator can be mathematically described as $$\{w_i\}_{i=1}^{K} \text{ where } w_i = \frac{\hat{h}_i^*}{\alpha}$$

and α is a scaling factor (where the scaling is discussed above). A limit of $K \leq QN$ can be applied due to the possible truncation operation described above. As shown in FIGS. 2B and 2C (when the switch 212 is in the bottom position), the back-end symbol combiner is a linear combiner that combines the despreader outputs $\{c_i\}$ by $\{w_i\}$ to generate the decision variable 222, $$z = \sum_{i=1}^{K} w_i c_i.$$

The combining operation can be implemented by a series of multiply-and-add operations that requires only one complex multiplier, as shown in FIG. 2B by replacing $\hat{h}_i^*$ with $w_i$. The output decision variable 222 is then communicated to a decision device, decoder and/or synchronization loops for further processing.

The following references are applicable to the foregoing description of the present invention to provide background in the related art: J. G. Proakis, Digital communications, $3^{rd}$ ed., New York, McGraw-Hill, 1995; and ANSI/IEEE Std. 802.11, Wireless LAN medium access control (MAC) and physical layer (PHY) specifications, 1999, which are both incorporated by reference herein.

2. Exemplary Method Implementing the Channel Matched Filter

Figure 3:
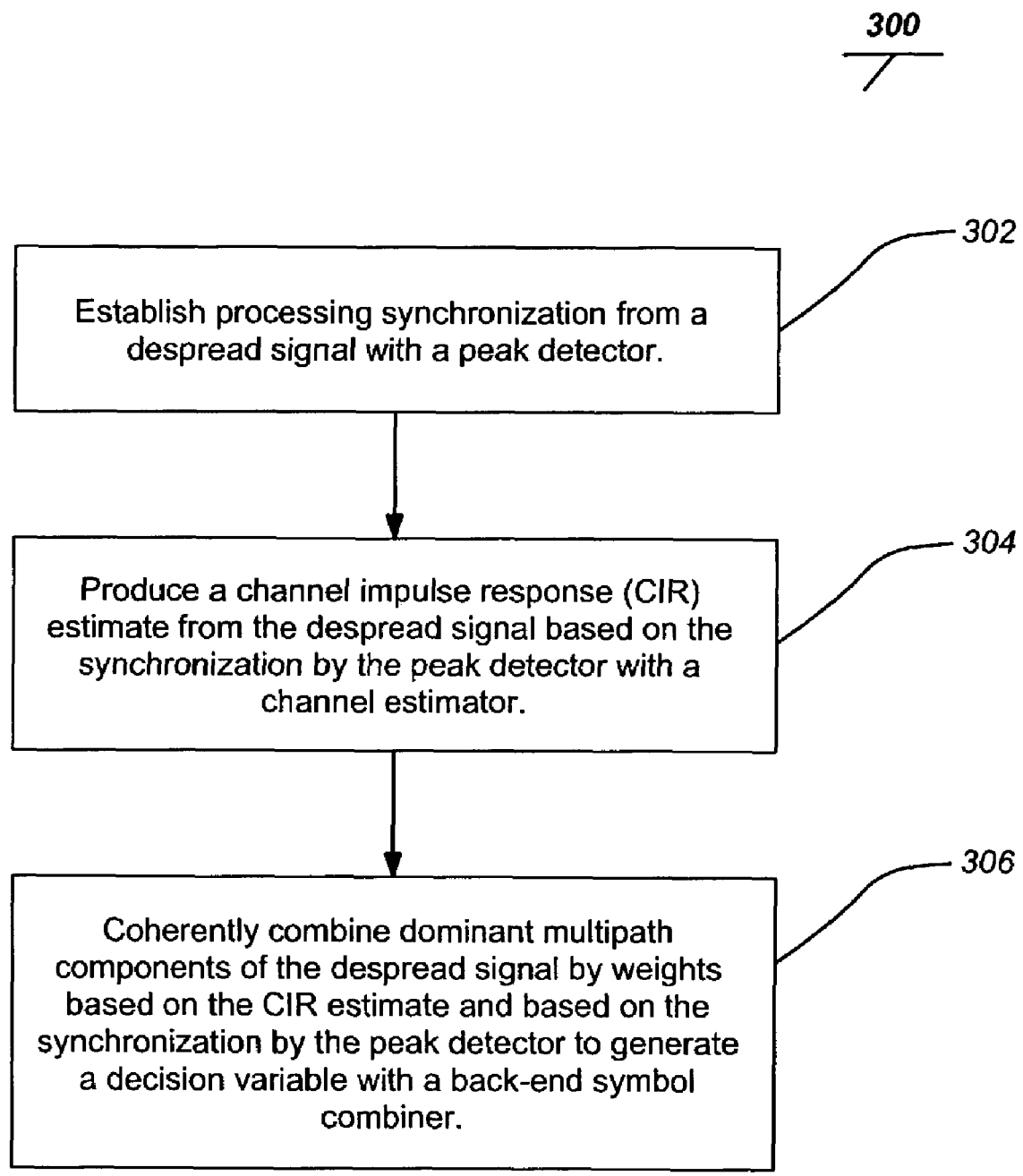
FIG. 3 is a flowchart of an exemplary method implementing the present invention.

FIG. 3 is a flowchart of an exemplary method of the present invention. In a manner that parallels the description of a channel matched filter implementation of the present invention, a typical method of channel matched filtering 300 can be described as follows. At block 302, processing synchronization from a despread signal with a peak detector is established. Following this at block 304, a channel impulse response (CIR) estimate is produced from the despread signal based on the synchronization by the peak detector with a channel estimator. Finally at block 306, dominant multipath components of the despread signal are coherently combined by weights based on the CIR estimate and based on the synchronization by the peak detector to generate a decision variable with a back-end symbol combiner.

3. Exemplary Receiver Implementation

Figure 4A:
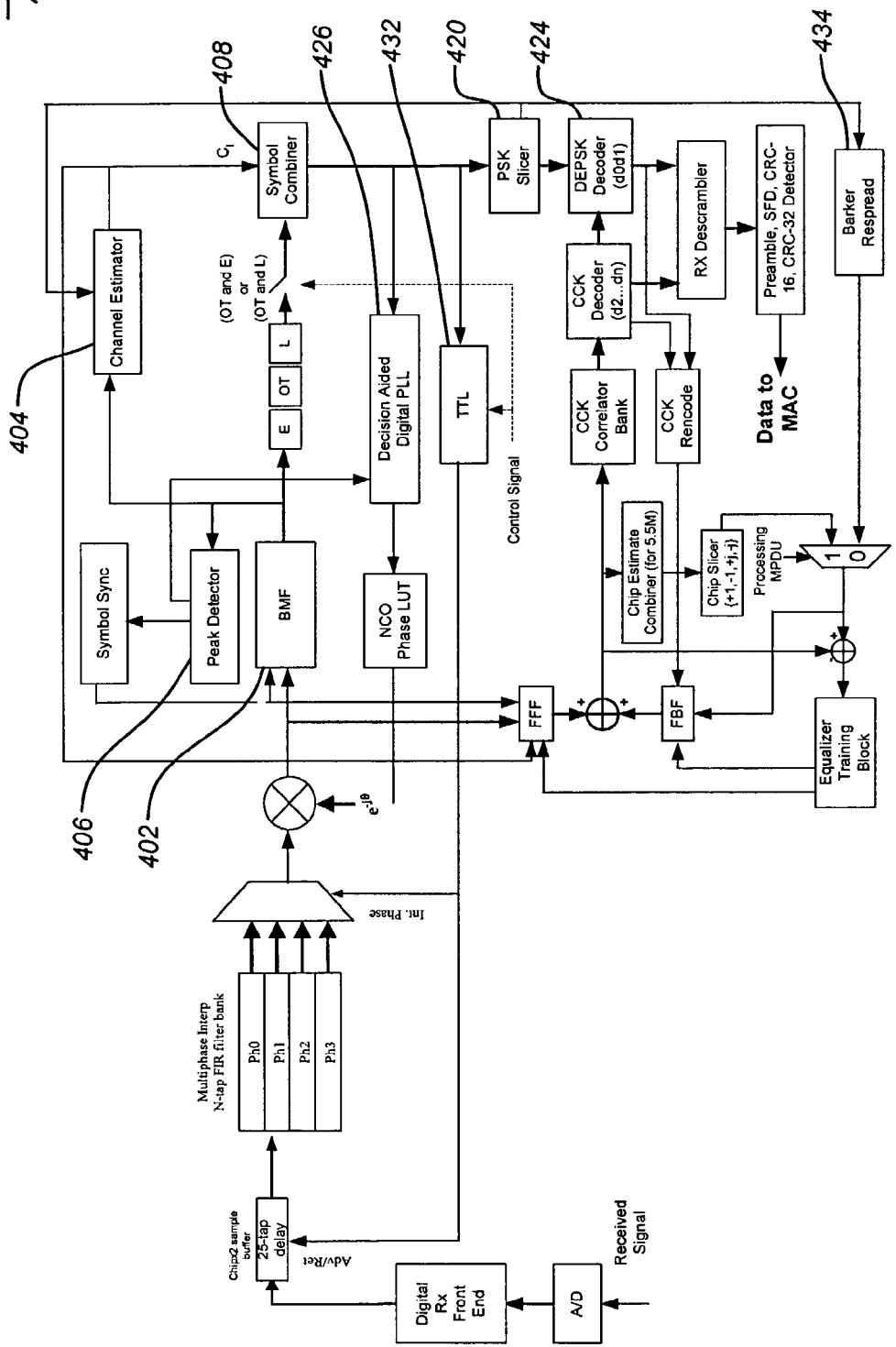
FIGS. 4A-4C are block diagrams of an exemplary receiver architecture implementing the present invention.

FIG. 4A is a block diagram of an exemplary receiver 400 implementing a back-end channel matched filter of the present invention. The following description details an implementation of a back-end channel matched filter in a WLAN receiver, however, the scope of the invention is not limited to the exemplary receiver implementation described hereafter.

The back-end channel matched filter can replace the rake finger front-end structure typically found in mobile station modems (MSMs). The 802.11b link does not require a sophisticated rake receiver architecture found in many CDMA devices, since there is no soft hand-off or dynamically changing multipath, there is no need to perform per-finger tracking and no need to assign and reassign elements to new paths.

As previously described, a typical channel matched filter embodiment of the present invention comprises three key elements: the peak detector 208, the channel estimator 210 that coherently averages the channel profile using the pseudo-noise (PN) probing method and the symbol combiner 206 that coherently combines dominant multipath components. The exemplary receiver 400 of FIG. 4A includes a Barker matched filter 402 (BMF), which is a despreader, that provides input to a channel estimator 404, a peak detector 406 and a symbol combiner 408 described in detail hereafter in the context of the overall receiver 400.

3.1 Exemplary Channel Estimator

Figure 4B:
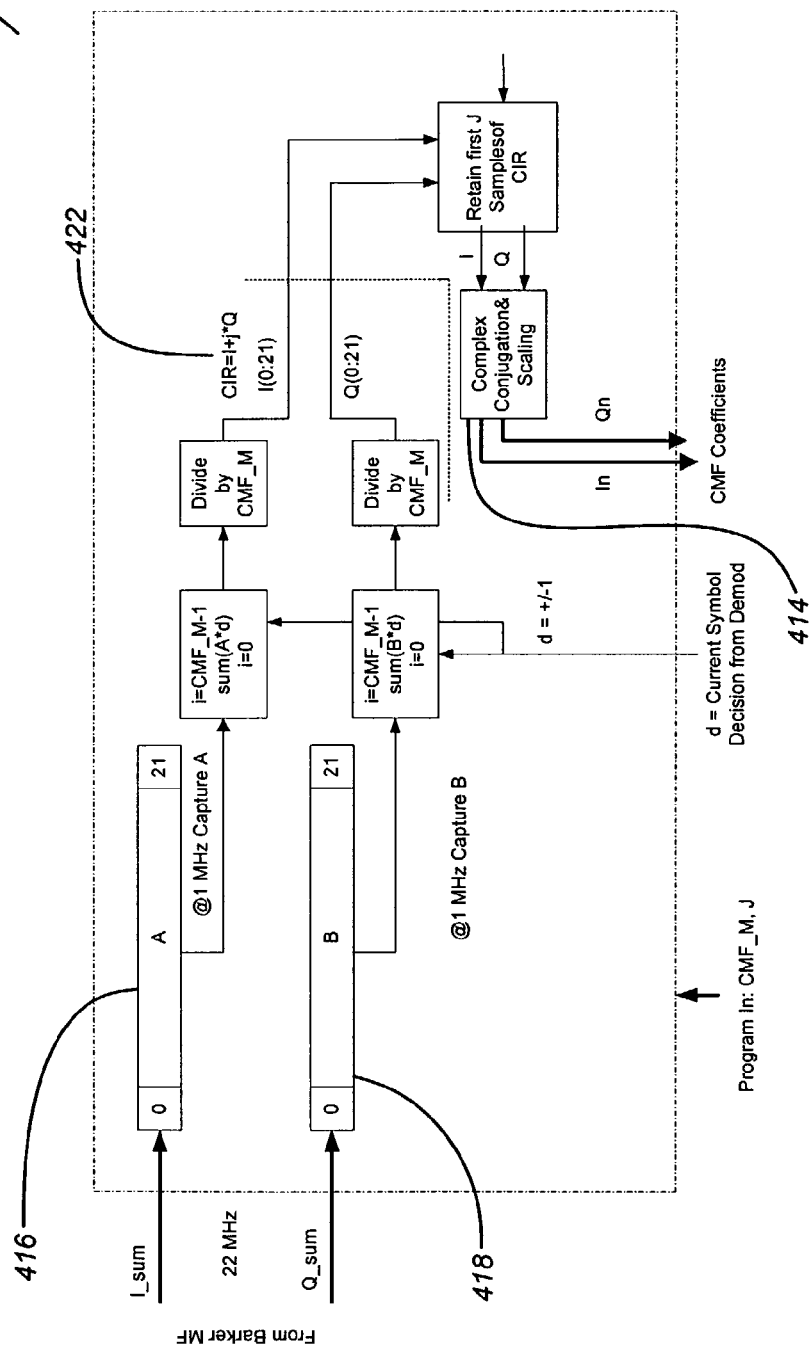

FIG. 4B illustrates details of the exemplary channel estimator 404 of FIG. 4A. Channel estimation is initiated shortly after timing and frequency/phase synchronization have been achieved (e.g., about 18 μs after starting the phase lock loop (PLL) and timing tracking loop (TTL)) because the frequency and phase errors have to be removed prior to CMF channel estimation. The purpose of the channel estimator 404 is to produce an estimate of the complex-valued channel transfer function, which is the convolution of the transmit pulse shaping filter, the propagation channel, and the received matched filter. This is performed by a psuedo-noise probing method. The correlation block of the peak detector 406 can be partially shared here. Some trivial modification is required however to achieve long coherent average of the peaks. Also, the actual signed values of the correlation results (as opposed to absolute values of the peak detector 406) have to be added to support channel estimation tasks. Hardware optimization can be performed to reuse hardware as is known in the art.

As shown in FIG. 2, the main steps performed by the channel estimator 404 are described here. Particular variables are assigned and identified in italics with reference to the figures to illustrate the operation of the invention.

The channel estimator 404 first coherently accumulates the BMF 402 outputs (e.g., 22 complex-valued correlations) for CMF_M periods of Barker sequence, that is, for CMF_M μs. Specifically, prior to accumulating and averaging the Barker correlations, the contents of register A 416 and register B 418 are multiplied by +1 or −1 (which is the symbol decision from the PSK slicer 420 (see FIG. 4A)) to remove data modulation. This allows correlating beyond one preamble symbol boundary. The averaged result is the channel impulse response 422 (CIR), denoted as I+j*Q in FIG. 4B. Note that the divide-by-M block can be implemented as first right-shifting the input by ($\log_2 M$) bits.

Simulations using various SNRs and rms delay spreads can confirm that, for an exemplary AGC set point of 200, the CIR cab be scaled with a constant value of $1/128$ (instead of using a normalization factor that is inversely proportional to the square root of the sum of squares of the multipath magnitude profile, which requires complicated arithmetic operations and is not suitable for efficient hardware implementation), and the resulting performance degradation is negligible. Thus, the hardware can use a set of simplified (but close to optimal) CMF coefficients, that is $$\frac{I(i)}{128} - j\frac{Q(i)}{128}$$

for symbol combining.

CIR estimates at consecutive J offsets, that is, $$\frac{I(i)}{128} - j\frac{Q(i)}{128},$$

i=1, . . . , J are used as CMF coefficients, and thus J consecutive samples starting from the symbol boundary are combined.

With this exemplary modification, In and Qn in FIG. 4B are defined as In=I and Qn=−Q (that is, taking the complex conjugation). The factor of $1/128$ (i.e., the denominator of the simplified CMF coefficients is 128) is handled in the symbol combiner (see Section 3.2 below).

3.2 Exemplary Symbol Combiner

Figure 4C:
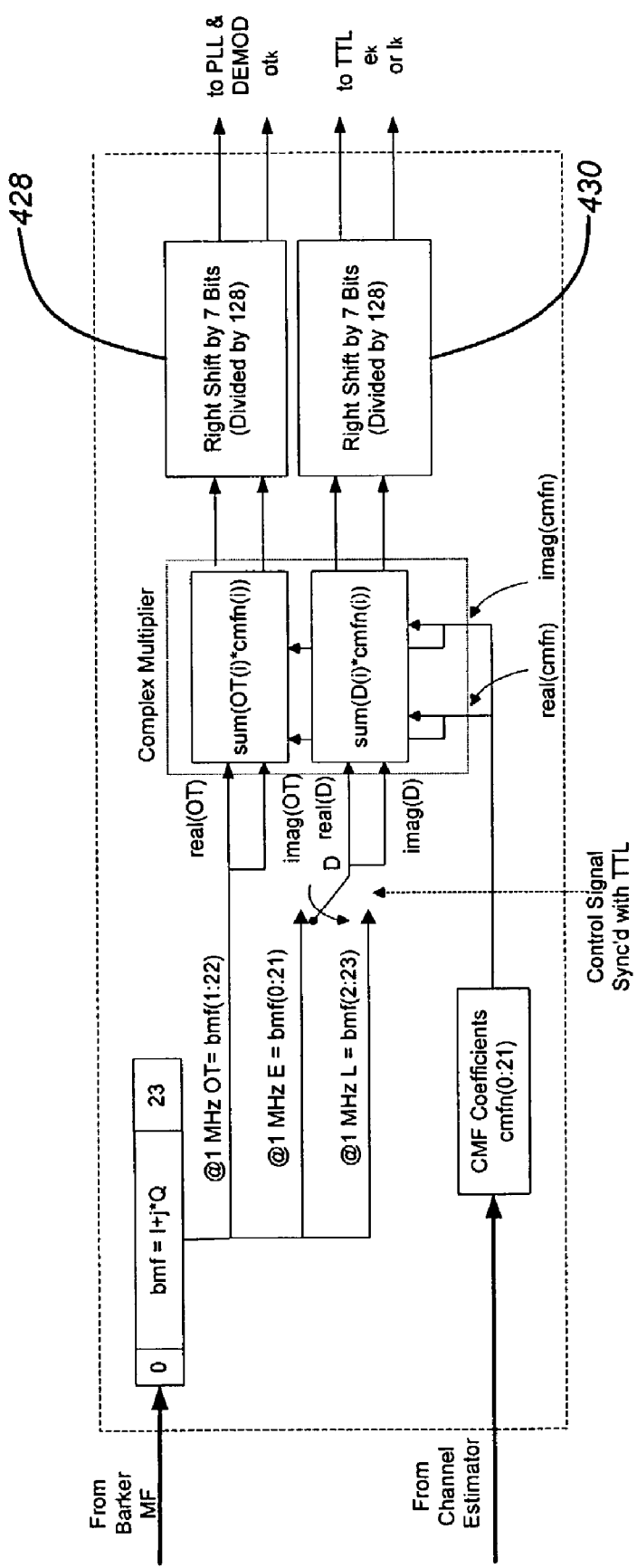

As shown in the block diagram in FIG. 4C, the symbol combiner 408 is a linear combiner that combines the BMF 402 outputs (which are the despread symbols at different multipath delays) with the CMF coefficients cmfn. For notational simplicity, the 22-element complex-valued vector cmfn is formed from augmenting $\{cmfn\_i\}_{i=1}^{K}$ by setting zero coefficients for those nonqualified multipath components (that is, those that were truncated in the combiner weight generator). For example, cmfn(0) corresponds to bmf_acc(0)=I(0)+j*Q(0) in FIG. 4B. The BMF 402 generates 24 correlations. Specifically, bmf(1:22) corresponds to the correlations at 22 offsets based on the current (on-time) timing, and bmf(0:21) and bmf(2:23) correspond to the early and late versions, respectively.

The on-time symbol in the k-th symbol interval, computed by:

$$ot_k = \sum_{i=0}^{21} comfn(i) * OT(i) \qquad (3)$$

where TO(i)=bmf(i+1) represents the i-th element of the array, TO is the decision variable for the DEPSK decoder 424 through slicer 420 in FIG. 4A, and is also used to drive the decision-aided digital PLL 426. The early and late symbols, computed by:

$$e_k = \sum_{i=0}^{21} comfn(i) * E(i) \text{ with } E(i) = bmf(i) \qquad (4)$$

and $$l_k = \sum_{i=0}^{21} comfn(i) * L(i) \text{ with } L(i) = bmf(i+2) \qquad (5)$$

respectively, are fed into the TTL 432 to fine tune the timing. See FIG. 4A. Note that Equations (3), (4), and (5) involve complex multiplications (see FIG. 4C). Also note that Equations (3), (4), and (5) are presented only to illustrate how the combining can be performed; however, in a hardware implementation, $to_k$, $e_k$, and $l_k$ are typically obtained by summing over nonzero CMF coefficients only.

Since the TTL 432 is used for time tracking, only one of $e_k$ and $l_k$ is computed at any given symbol interval. Note that typical embodiments of the invention employ a double dither loop (DDL) as the TTL 432. For example, only $e_k$ is computed and passed to the TTL 432 at symbol n, and only $l_k$ is computed and passed to TTL 432 at symbol n+1. Whether $e_k$ or $l_k$ is computed in a given symbol interval is determined by the control signal which is synchronized with that of the TTL 432. This allows for sharing of the multiplier for computing the early and late symbols in hardware.

Note that as shown in FIG. 4C, blocks 428, 430 are used to generate a scaling factor of 1/128, which is used to approximate the denominator of Equation (2) for (simplified) hardware computation of the CMF coefficients.

3.3 Preamble Budget and Equalizer Timeline

One of the most challenging and important tasks of implementing a 802.11b receiver is achieving signal detection and synchronization. These tasks are performed during the preamble part of the frame, and set the stage for a successful demodulation of physical layer convergence protocol (PLCP) header and MAC layer protocol data units (MPDU). The acquisition process includes initial detection of RX energy ramp, coarse AGC training, and coarse DC offset removal. The next steps include fine AGC setting, DC offset loop convergence, and Barker sequence detection (operating similar to a CDMA searcher). Finally, other steps include frequency and phase estimation and tracking, channel impulse response (CIR) estimation, computation of CMF coefficients, and equalizer training and adaptation. Some of these tasks can be repeated for an alternative antenna selection in a diversity mode.

For a typical receiver, the preamble is always transmitted at 1 Mb/s. There are two types of preamble defined by the standard, the mandatory Long Preamble and the optional Short Preamble. Depending upon whether it is a Long Preamble or Short Preamble, the header is transmitted at 1 Mb/s or 2 Mb/s, respectively. The Barker chip rate is always 11 Mc/s. For 1 Mb/s transmission and each bit is mapped to 11 Barker chips using DBPSK. For 2 Mb/s, 2 bits are mapped to 11 Barker chips using DQPSK.

The mandatory Long Preamble is comprised of a 128-bit Sync Field plus a 16-bit start frame delimiter (SFD) for a total of 144 bits, followed by a 48-bit PLCP Header transmitted at 1 Mb/s. With the Long Preamble, the Preamble lasts 1584 chips and the Header lasts 528 chips.

The optional Short Preamble is comprised of a 56-bit Sync Field plus a 16-bit SFD (for a total of 72 bits), followed by a 48-bit PLCP Header transmitted using 2 Mb/s DQPSK. With the Short Preamble, the Preamble lasts 792 chips and the Header lasts 264 chips.

Figure 4D:
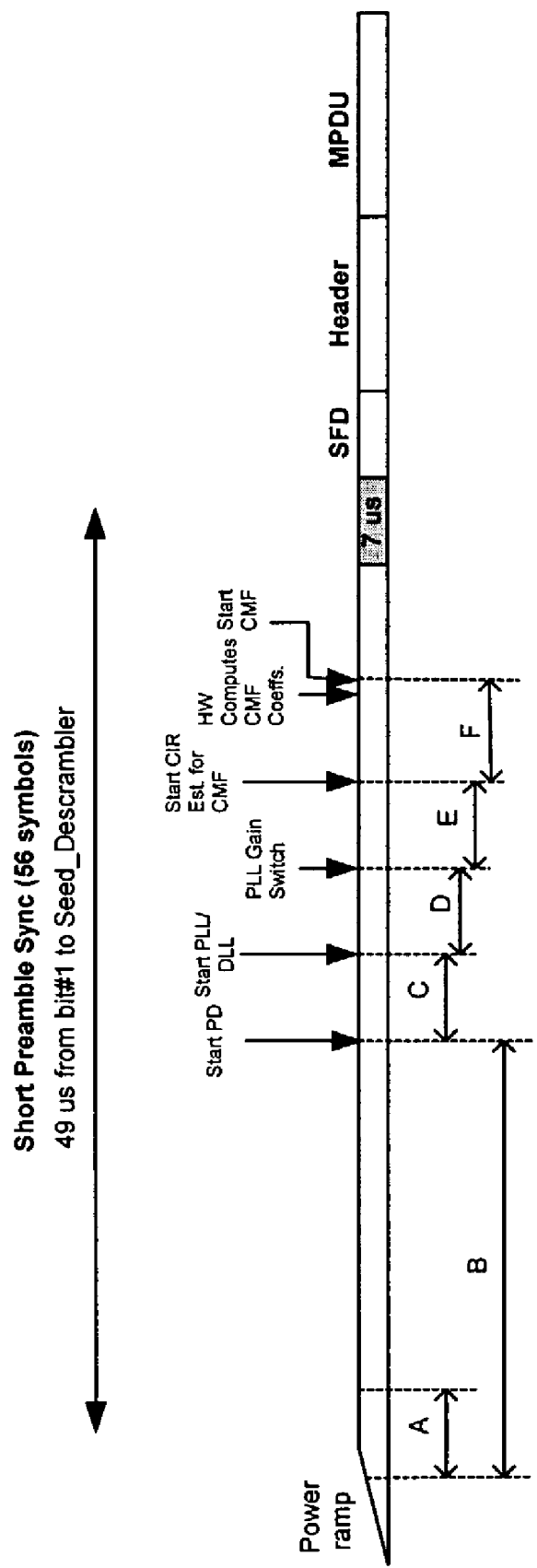
FIG. 4D is a timeline of a short preamble budget and equalizer timeline in an exemplary receiver of the invention.

FIG. 4D illustrates a timeline of an exemplary Short Preamble budget. The support of a Short Preamble is contemplated with the present invention, and thus some embodiments require very fast detection and synchronization mechanisms to be implemented. Only limited antenna diversity may be supported in case of a Short Preamble. Note that much can be gained in terms of sensitivity and PER if only the Long Preamble mode were supported, or if Short Preamble mode was supported but the device were placed in a Long Preamble-only mode. The timeline for Long Preamble is the same as that for the Short Preamble as shown in FIG. 4D. Several important points are shown.

As shown in FIG. 4D, the power detector will detect the power ramp that is shown on the timeline at some point during the gain switching segment A. This will trigger all subsequent frame processing. The power detection speed is a function of power level, and therefore can take from 1 to 10 μs. In case of fast power detection (High Power level) the analog AGC gain stage switching will follow. If the power is low, and it can take up to 10 μs to detect it, the gain switching is not required and the AGC can settle faster. Because of this, another segment B is shown overlapping with segment A. In addition to the task in segment A, gain stage switching, DC offset correction and Digital VGA settling is performed in segment B. It is important to point out that the overall time expected for segment B is approximately 16.4 μs. Antenna switching based on detected power is not typically supported. Instead, a blind antenna-switching algorithm can be implemented, where the antenna is switched every 10 μs.

After the deterministic RX front-end associated delay (segment B) the peak detector 406 is initialized for a programmable 1-8 μs, with default set to 2 μs, marking the start of segment C.

If the Barker correlation is detected, the PLL 426 and TTL 432 will start simultaneously at the beginning of segment D, providing a possible 1 µs delay for the PLL 426 start in case the largest peak is too close to the local symbol boundary. The duration of segment D is of the order of 12-15 µs, required for the PLL to settle and lock. However, this value depends on the loop bandwidth.

The PLL Gain switch to tracking mode will indicate the start of segment E, which is needed to provide a safe harbor before the CMF CIR is estimated. There is a phase transient that is associated with gain switching. Currently, approximately 8 µs is allocated for this transient to die down.

Segment F is programmable from 0-16 µs, with a default setting of 8 µs. This segment allows for hardware to perform the actual CMF CIR estimation.

To support the Short Preamble, all the listed tasks must be performed in 49 µs, starting from the very first bit of the Preamble. An additional 7 µs are needed to synchronize the descrambler, however. To support the Short Preamble, the hardware computes the CMF coefficients using a simplified scaling scheme as previously discussed and then starts CMF combining immediately. As a result, the sum of all segments up to and including where CMF starts is T=16.4+2+1+12+8+8=47.4<49 µs, meeting the short preamble requirement.

CONCLUSION

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A channel matched filter, comprising:
   a peak detector for establishing processing synchronization from a despread signal;
   a channel estimator producing a channel impulse response (CIR) estimate from the despread signal based on a synchronization signal from the peak detector, wherein the channel estimator comprises a slicer that operates at approximately a cursor timing generated by the peak detector to produce the CIR estimate; and
   a back-end symbol combiner coherently combining dominant multipath components of the despread signal by weights based on the CIR estimate based on the synchronization signal from the peak detector to generate a decision variable.

2. The channel matched filter of claim 1, wherein the despread signal comprises a signal correlated with a spreading sequence replica.

3. The channel matched filter of claim 1, wherein the peak detector establishes processing synchronization by estimating the cursor timing and a symbol boundary from a magnitude profile of the despread signal for the channel estimator and the back-end symbol combiner.

4. The channel matched filter of claim 3, wherein a variance of the magnitude profile is reduced by averaging a magnitude value over a predetermined number of magnitude estimates.

5. The channel matched filter of claim 3, wherein the cursor timing is estimated by determining an offset of a largest magnitude value of the magnitude profile, from a plurality of magnitude values over a predetermined segment.

6. The channel matched filter of claim 3, wherein the symbol boundary is determined according to a fixed offset prior to the cursor timing on the magnitude profile.

7. The channel matched filter of claim 3, wherein the symbol boundary is determined by a furthest local maximum having a magnitude exceeding a threshold value prior to the cursor timing on the magnitude profile.

8. The channel matched filter of claim 1, wherein the channel estimator produces the CIR estimate in a decision directed manner.

9. The channel matched filter of claim 1 wherein the slicer is operated over a plurality of probing intervals for averaging to reduce variance of the CIR estimate.

10. The channel matched filter of claim 1, wherein the CIR estimate of the channel estimator is processed by one or more of the operations comprising complex conjugation, truncation and scaling to produce the CIR estimate.

11. The channel matched filter of claim 1, wherein the back-end symbol combiner combines the despread signal by the weights based on the CIR estimate to generate the decision variable.

12. The channel matched filter of claim 11, wherein the back-end symbol combiner comprises a linear combiner combining the despread signal by the weights based on the CIR estimate by performing a series of multiply and add operations to generate the decision variable.

13. A method of channel matched filtering, comprising:
    establishing processing synchronization from a despread signal with a peak detector;
    producing a channel impulse response (CIR) estimate from the despread signal based on a synchronization signal from the peak detector with a channel estimator, wherein the channel estimator comprises a slicer that operates at approximately a cursor timing generated by the peak detector to produce the CIR estimate; and
    coherently combining dominant multipath components of the despread signal by weights based on the CIR estimate and based on the synchronization signal from the peak detector to generate a decision variable with a back-end symbol combiner.

14. The method of claim 13, wherein the despread signal comprises a signal correlated with a spreading sequence replica.

15. The method of claim 13, wherein the peak detector establishes processing synchronization by estimating the cursor timing and a symbol boundary from a magnitude profile of the despread signal for the channel estimator and back-end symbol combiner.

16. The method of claim 15, wherein a variance of the magnitude profile is reduced by averaging a magnitude value over a predetermined number of magnitude estimates.

17. The method of claim 15, wherein the cursor timing is estimated by determining an offset of a largest magnitude value of the magnitude profile, from a plurality of magnitude values over a predetermined segment.

18. The method of claim 15, wherein the symbol boundary is determined according to a fixed offset prior to the cursor timing on the magnitude profile.

19. The method of claim 15, wherein the symbol boundary is determined by a furthest local maximum having a magnitude exceeding a threshold value prior to the cursor timing on the magnitude profile.

20. The method of claim 13, wherein the channel estimator produces the CIR estimate in a decision directed manner.

21. The method of claim 13, wherein the slicer is operated over a plurality of probing intervals for averaging to reduce variance of the CIR estimate.

22. The method of claim 13, wherein the CIR estimate of the channel estimator is processed by one or more of the operations comprising complex conjugation, truncation and scaling to produce the CIR estimate.

23. The method of claim 13, wherein the back-end symbol combiner combines the despread signal by the weights based on the CIR estimate to generate the decision variable.

24. The method of claim 23, wherein the back-end symbol combiner comprises a linear combiner combining the despread signal by the weights based on the CIR estimate by performing a series of multiply and add operations to generate the decision variable.

25. A channel matched filter, comprising:

means for establishing processing synchronization from a despread signal;

means for producing a channel impulse response (CIR) estimate from the despread signal based on a synchronization signal from the means for establishing process synchronization, wherein the means for producing the CIR estimate comprises a slicer that operates at approximately a cursor timing generated by the means for establishing processing synchronization to produce the CIR estimate; and means for coherently combining dominant multipath components of the despread signal by weights based on the CIR estimate based on the synchronization signal to generate a decision variable.

* * * * *